United States Patent Office 3,440,239
Patented Apr. 22, 1969

3,440,239
PREPARATION OF DIAZO COMPOUNDS
George R. Harvey, Kirkwood, Mo., assignor to Monsanto Company, St. Louis, Mo., a corporation of Delaware
No Drawing. Filed Nov. 12, 1965, Ser. No. 507,565
Int. Cl. C07c 113/04, 113/00
U.S. Cl. 260—141                 8 Claims

ABSTRACT OF THE DISCLOSURE

Preparation of diazo esters and amides by the reaction, in an inert organic liquid, of (1) a phosphorane of the formula

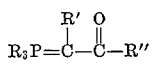

wherein R is selected from the group consisting of alkyl having a maximum of 12 carbon atoms, tolyl and phenyl; R' is selected from the group consisting of hydrogen, chlorine, bromine, phenyl and alkyl having a maximum of 4 carbon atoms; and R" is selected from the group consisting of alkoxy having a maximum of 12 carbon atoms, amino, phenyl substituted amino, and alkyl substituted amino having a maximum of 8 carbon atoms; with (2) an azide of the formula $$R'''N_3$$

wherein R''' is an aromatic radical selected from the group consisting of phenyl, benzenesulfonyl; benzoyl and substituted said aromatic radicals in which the substituent is selected from the group consisting of chlorine, bromine, nitro and alkyl having a maximum of 4 carbon atoms.

Diazo esters and amides are known chemical intermediates.

---

This invention relates to a novel method of preparing a class of diazo compounds by the reaction of ylids with azides. The method involves the equation:

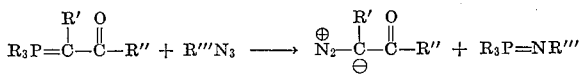

wherein R is selected from the class consisting of alkyl of up to 12 carbon atoms tolyl and phenyl; wherein R' is selected from the class consisting of hydrogen, chlorine, bromine phenyl and alkyl of up to 4 carbon atoms; wherein R" is alkoxy of up to 12 carbon atoms, amino, phenyl substituted amino and alkyl substituted amino wherein the alkyl groups have up to 8 carbon atoms; wherein R''' is selected from the aromatic radicals of the class consisting of phenyl, benzenesulfonyl, benzoyl and the said aromatic radicals having substituents of the class consisting of chlorine, bromine, nitro and alkyl having up to 4 carbon atoms.

The novel method is useful in the preparation of phytotoxic compounds suitable for the inhibition of the growth of unwanted vegetation.

The novel method involves the reaction between a phosphorane and an azide to form α-diazo carbonyl compounds. The reaction is conducted with the reactants dissolved in an inert organic liquid, particularly the chlorinated hydrocarbons, such as chloroform, methylene chloride, carbon tetrachloride, 1,2-dichloroethane - 1,2 - propylene dichloride and the like. The reactants may each be dissolved in the same or different chlorinated hydrocarbons, but preferably the same hydrocarbon solvent will be used. The mixtures of the dissolved reagents usually require no heating, and subnormal temperatures may be necessary to prevent an excessive reaction rate. Depending upon the selection of the azide the reaction may proceed rapidly, as in the use of benzenesulfonyl azide, or slowly as in the use of phenyl azide. With the more active combinations of reagents dilute solution of the reactants may be required. Similarly, control of the reaction may be accomplished at very low temperatures.

Further details of the novel procedure are set forth in the following examples:

Example 1

Tosyl azide (5.7 grams) was dissolved in 30 ml. of methylene chloride. Carbethoxymethylene triphenylphosphorane (10 grams) dissolved in 30 ml. of methylene chloride at 0° C. After 0.5 hour the reaction mixture was concentrated by evaporation on a water bath. The resulting residue was triturated with ether and recrystallized from a mixture of benzene and pentane. The product with a melting point of 182–183° C. was identified and the structure confirmed by infrared spectrum as ethyl diazoacetate.

Example 2

By the procedure of Example 1 tosyl azide was reacted with carbethoxyethylidenetriphenylphosphorane. The product was distilled at 50° C./0.2 mm. The colorless oil $n_D^{24}$ 1.4474 was found to have the formula

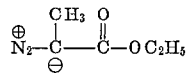

Example 3

In general accordance with the procedure of Example 1, a solution of 19.6 grams of tosyl azide in 100 ml. of methylene chloride was added to 37.5 grams of N,N-diethylcarbamoylmethylenetriphenylphosphorane dissolved in 100 ml. of methylene chloride. The product was identified as α-diazo-N,N-diethylacetamide.

Example 4

Using the procedure of Example 1 benzoyl azide was mixed with carbethoxychloromethylenetri(n - butyl)phosphorane in carbon tetrachloride solution. The resulting product had the formula

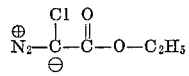

Example 5

The reaction between phenyl azide and N,N-di(n-butyl) carbamoylbenzylidenetriphenylphosphorane by the procedure of Example 1 resulted in the formation of a compound of the formula

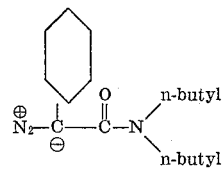

Example 6

The procedure of Example 1 was repeated using ethyl axide and carbethoxybromomethylenetri(p-toluyl)phosphorane. The resulting compound was ethyl α-diazo-α-bromoacetate.

Example 7

In a substantial repetition of the procedure of Example 1, the reaction between p-nitrobenzoyl azide and carbamoylpropylidenetriphenylphosphorane in an ethylene dichloride solution resulted in the formation of α-diazo-n-butyramide.

Example 8

Using the procedure of Example 1, chlorobenzoyl azide was reacted with carbododecyloxymethylenetri-(nitro-phenyl)-phosphorane. The resulting product was identified as dodecyl-α-diazoacetate.

Although the invention is described above with respect to specific embodiments, it is not intended that the details thereof are to be construed as limitations on the scope of the invention except to the extent incorporated in the appended claims.

The embodiments of the invention in which an exclusive property or privilege is claimed are defined as follows:

1. The method of preparing diazo compounds of the formula

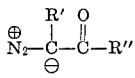

wherein R' is selected from the class consisting of hydrogen, chlorine, bromine, phenyl and alkyl of up to four carbon atoms and R'' is selected from the class consisting of alkoxy having up to 12 carbon atoms, amino, phenyl substituted amino and alkyl substituted amino wherein the alkyl groups have up to 8 carbon atoms; which comprises reacting, in an inert organic liquid, azides of the formula

wherein R''' is selected from the class consisting of aromatic radicals of the class consisting of phenyl, benzenesulfonyl, benzoyl, and the said aromatic radicals containing substituents selected from the class consisting of chlorine, bromine, nitro and alkyl having up to 4 carbon atoms; with phosphoranes of the formula

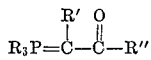

wherein R is selected from the class consisting of alkyl of up to 12 carbon atoms, tolyl and phenyl.

2. The method of claim 1 wherein the phosphorane is N,N - dialkylcarbamoylmethylenetriphenylphosphorane wherein the alkyl moiety has up to 8 carbon atoms and the azide is p-methylbenzenesulfonyl azide.

3. The method of claim 1 wherein the phosphorane is carbalkoxymethylenetritolylphosphorane wherein the alkoxy moiety has up to 12 carbon atoms and the azide is benzenesulfonyl azide.

4. The method of claim 1 wherein the phosphorane is N,N - diphenylcarbamoylmethylenetriphenylphosphorane and the azide is benzoyl azide.

5. The method of claim 1 wherein R' is hydrogen, R'' is ethoxy, R''' is toluenesulfonyl and R is phenyl.

6. The method of claim 1 wherein R' is methyl, R'' is ethoxy, R''' is toluenesulfonyl and R is phenyl.

7. The method of claim 1 wherein R' is hydrogen, R'' is diethylamino, R''' is toluenesulfonyl and R is phenyl.

8. The method of claim 1 wherein R' is chlorine, R'' is ethoxy, R''' is benzoyl and R is n-butyl.

References Cited

UNITED STATES PATENTS 3,163,633   12/1964   Steppan et al. _____ 260—141

CHARLES B. PARKER, *Primary Examiner.*

DONALD M. PAPUGA, *Assistant Examiner.*

U.S. Cl. X.R.

260—349, 476, 487, 488, 558